United States Patent [19]

Hull et al.

[11] Patent Number: 4,766,351

[45] Date of Patent: Aug. 23, 1988

[54] STARTER FOR INDUCTIVELY COUPLED PLASMA TUBE

[76] Inventors: Donald E. Hull, 969 Nambe Loop; Thomas M. Bieniewski, 285 Donna Ave., both of Los Alamos, N. Mex. 87544

[21] Appl. No.: 67,080

[22] Filed: Jun. 29, 1987

[51] Int. Cl.[4] .......................... B23K 5/00; B23K 9/00; H01J 7/24

[52] U.S. Cl. .................................... 315/240; 315/236; 315/111.51; 315/226; 313/231.31; 219/10.65; 219/10.75; 219/121.52

[58] Field of Search ...................... 315/111.21, 111.51, 315/236, 240, 248, 267, 111.1, 111.41; 219/121 PR, 121 PM, 10.75, 10.57, 10.65; 313/161, 231.31

[56] References Cited

U.S. PATENT DOCUMENTS

| | | | |
|---|---|---|---|
| 3,007,030 | 10/1961 | Ducati | 219/121 PR |
| 3,138,739 | 6/1964 | Farmer | 315/248 X |
| 3,153,175 | 10/1964 | Winzeler | 315/111.21 |
| 3,296,410 | 1/1967 | Hedger | 219/121 PR |
| 3,311,775 | 3/1967 | Solow | 315/236 X |
| 3,407,281 | 10/1968 | Greene et al. | 219/121 PR |
| 4,080,549 | 3/1978 | Creedon et al. | 313/231.31 X |
| 4,431,901 | 2/1984 | Hull | 219/121 PR X |
| 4,549,065 | 10/1985 | Camacho et al. | 219/121 PR X |
| 4,612,477 | 9/1986 | Dothan | 315/111.21 |

*Primary Examiner*—David K. Moore
*Assistant Examiner*—Mark R. Powell

[57] ABSTRACT

A starter assembly is provided for use with an inductively coupled plasma (ICP) tube to reliably initate a plasma at internal pressures above about 30 microns. A conductive probe is inserted within the inductor coil about the tube and insulated from the tube shield assembly. A capacitive circuit is arranged for momentarily connecting a high voltage radio-frequency generator to the probe while simultaneously energizing the coil. When the plasma is initiated the probe is disconnected from the generator and electrically connected to the shield assembly for operation.

6 Claims, 1 Drawing Sheet

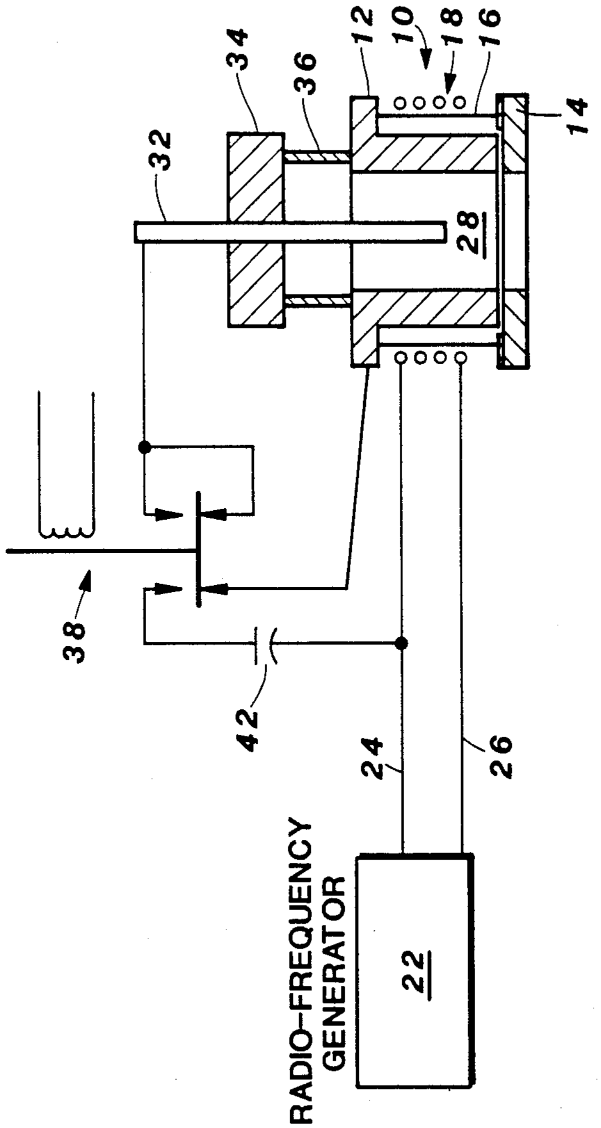
34
36
32
12
10
18
16
14
28
38
42
24
26
RADIO-FREQUENCY GENERATOR
22

STARTER FOR INDUCTIVELY COUPLED PLASMA TUBE

This invention is the result of a contract with the Department of Energy (Contract No. W-7405-ENG-36).

BACKGROUND OF THE INVENTION

The present invention is generally directed to inductively coupled plasma (ICP) tubes and, more particularly, to apparatus for initiating plasma in ICP tubes.

High frequency induction plasma tubes are conventional devices for producing high temperature gaseous plasmas. Conventional ICP tubes include an electrical induction coil surrounding an enclosure which may include an internal shield. The coil is connected to a source of high voltage radio-frequency energy, conventionally in the frequency range of 400 kHz to 5 MHz. A low pressure gas, such as argon, is commonly used as the ionizable gas forming a hot gaseous plasma inside the shield assembly.

To ionize the gas and initiate the plasma, a high voltage is applied to the induction coil, which induces a sufficient voltage on the shield to establish an arc to a lower mounting flange beneath the shield. The arc initiates the plasma at very low pressures, i.e., around 30 microns. However, at higher pressures the arcing does not occur and the plasma is not established. An ICP tube using the induced shield voltage to initiate the plasma is described in Donald E. Hull et al., "Combination Induction Plasma Tube And Current Concentrator For Introducing A Sample Into A Plasma," U.S. Ser. No. 867,127, filed May 27, 1986, and incorporated by reference herein.

An alternate method for initiating plasma in an ICP tube is taught in Felix Dothan, "Triggering Device For A Vacuum Arc In A Plasma Centrifuge," U.S. Pat. No. 4,612,477, dated Sept. 16, 1986. As therein described, a spark gap is formed adjacent to the cathode. The resulting vacuum arc then creates the plasma in the device.

The prior art ICP devices typically require a very low pressure in the order of 20 to 50 microns for reliable plasma initiation. Such low pressures can be difficult to obtain. However, at pressures above about 50 microns the initiation of a plasma becomes uncertain and, at still higher pressures, not possible using induced voltage on the shield.

This problem is substantially minimized with the present invention and an improved system is provided for initiating a plasma at internal pressures above 50 microns.

It is an object of the present invention to initiate plasma in an ICP tube with internal pressures greater than about 50 microns.

It is a further object of the present invention to provide the improved starting characteristics with minimum change to existing ICP tube design.

Yet another object of the present invention is to enable plasma initiation without tube damage from arcing within the tube.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise an inductively coupled plasma tube having a coil energizable by a high voltage radio-frequency generator and wound about a shield assembly defining an axis of the tube. A starter assembly is provided for use at pressures greater than about 30 microns and includes a conductive probe insulated from the shield assembly and placed within the coil along the axis.

In another characterization of the present invention a method is provided for starting an inductively coupled plasma tube having a coil energizable by a high voltage radio-frequency generator and wound about a shield assembly defining an axis of the tube and insulatingly mounted on a base. A conductive probe is inserted along the axis within the coil and insulated from the shield assembly. The probe is connected to the generator for a time effective to initiate ionization and generate the resulting plasma.

BRIEF DESCRIPTION OF THE DRAWING

The accompanying drawing, which is incorporated in and forms a part of the specification, illustrates the embodiments of the present invention and, together with the description, serves to explain the principles of the invention.

The FIGURE is a schematic representation of an ICP tube having a probe installed to facilitate starting in accordance with the present invention.

DETAILED DESCRIPTION OF THE PREFERRED EMBODIMENTS

Inductively coupled plasma (ICP) tube 10 is provided with a conventional shield assembly body 12. Shield 12 typically includes various water cooling cavities, not shown herein. Shield 12 is comprised of a conductive material, such as copper. Base assembly 14, which is also conventionally water cooled, is spaced below shield 12 by quartz enclosure 16. A preferred induction plasma tube is described in U.S. Pat. No. 4,431,901, issued Feb. 14, 1987, to Hull and incorporated herein by reference.

Induction coil 18 is placed around shield 12 and axially concentric therewith. Induction coil 18 is energized by radio-frequency generator 22 having a high voltage output lead 24 and a ground lead 26. As used herein, the term "top coil" is the coil connected to the high voltage output 24 and the term "bottom coil" is the coil connected to ground lead 26.

In accordance with the present invention, probe 32 is inserted within coil 18. The tip of probe 32 extends along the axial length of coil 18 and concentric with shield assembly 12. The axial location of the tip of probe 32 within coil 18 is not critical. However, the tip of probe 32 should be located in a magnetic field strong enough to maintain and generate a plasma from an initial ionization from probe 32. The tip of probe 32 should also be maintained above base 14 a distance sufficient to minimize arcing beyond volume 28. A preferred location is about midway between the top coil and the bottom coil of coil 18.

Probe 32 may be formed from a quartz tube with a conductor placed therein, but is preferably formed from an electrically conductive metal. In an ICP tube used for material transfer, probe 32 is preferably used as the material injection tube. Probe 32 is sealably mounted through top seal 34 which is insulatingly spaced above shield 12 by insulator spacer 36.

Probe 32 is electrically connected to contactor 38 to obtain a starting connection and an operating connection. Contactor 38 is preferably a vacuum contactor which may be remotely energized and may be selected from a number of commercial vacuum contactors. In a starting configuration, probe 32 is connected to radio-frequency generator 22 through capacitor 42. In an operating configuration, probe 32 is electrically connected to shield 12. Contactor 38 may be a simple switch, but the vacuum contactor avoids switch arcing at high voltages. A suitable switch is available as contactor #RB2A-26N300 from ITT Jennings, 970 McLaughlin Ave., San Jose, Calif.

To initiate a plasma within volume 28 of ICP tube 10, contactor 38 connects probe 32 to generator 22 through capacitor 42. Capacitor 42 is sized to limit the current delivered to probe 32 to control arcing within ICP tube 10. The capacitance of capacitor 42 must be sufficiently great, however, that sufficient power will be delivered to initiate plasma within volume 28. A suitable capacitor is available as capacitor type CFED, with a selected capacitance, from ITT Jennings. The plasma is initiated by momentarily energizing contactor 38 to connect the probe 32 to generator 22. By "momentarily" is meant a time effective to initiate the plasma where probe 32 is thereafter disconnected from generator 22. Contactor 38 is then de-energized to reconnect probe 32 to shield 12 for normal operation.

The starter system herein described enables plasma to be initiated at relatively high pressure. Table A shows a relationship between pressure, voltage in kV, and the capacitance in picofarads for one embodiment of the present invention. Probe 32 was inserted with the tip about halfway along the axial length of coil 18. Plasma could be initiated at pressures up to about 40 torr using a capacitance of 100 pF and at pressures up to about 400 torr with a capacitance of about 250 pF. In the experimental embodiment arcing occurred to prohibit starting above about 450 torr. The pressures depicted in Table A are easily obtainable in a plasma system which routinely uses a vacuum pump to facilitate the maintenance of clean conditions inside the ICP tube.

TABLE A

| P (torr) | C (pF) | STARTING VOLTAGE (kV)[1] |
|---|---|---|
| 0.051 | 100 | 4.0 |
| 0.299 | 100 | 3.5 |
| 0.500 | 100 | 3.5 |
| 1.0 | 250 | 2.5 |
| 1.009 | 100 | 3.5 |
| 5.381 | 100 | 5.0 (also 4.5) |
| 5.033 | 250 | 3.2 |
| 10.0 | 100 | 4.0 (also 4.5) |
| 10.150 | 250 | 3.2 |
| 19.973 | 100 | 3.5 |
| 20.140 | 250 | 3.0 |
| 40.164[2] | 250 | 3.4 |
| 60.7 | 250 | 5.0 |
| 82.991 | 250 | 5.0 |
| 122.40 | 250 | 5.5 |
| 184.78 | 250 | 6.0 |
| 202.08 | 250 | 6.0 |
| 268.32 | 250 | 6.5 |
| 347.30 | 250 | 6.5 |
| 393.50 | 250 | 7.0 |

TABLE A-continued

| P (torr) | C (pF) | STARTING VOLTAGE (kV)[1] |
|---|---|---|
| 450.0 | Could not start | |

[1]Frequency = 751 kHz
[2]Could not start with C = 100 pF

It will be appreciated that probe 32 may be used in ICP tube 10 to deliver gas and metal products for use with the plasma. Insulator 36 modifies a conventional ICP tube such that probe 32 can be insulated from shield 12 for a high voltage operation to initiate plasma within ICP tube 10 and for thereafter connecting to shield 12 for normal operation. The value of capacitor 42 and the starting voltages depicted herein are illustrative only and will depend on the geometry and operating frequency of the ICP tube in which the starter system is used. However, the functional relationships hereinabove described are believed to apply to all such systems.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use comtemplated. It is intended that the scope of the invention be defined by the claims appended hereto.

What is claimed is:

1. In an inductively coupled plasma tube having a coil with a high voltage lead energizable by a high voltage radio-frequency generator and a grounded lead and wound about a shield assembly defining an axis of said tube, a starter assembly effective for internal pressures greater than 30 microns, comprising:
   - a conductive probe for connecting with said generator and insulated from said shield assembly and placed within said coil along said axis; and
   - a starter circuit including a capacitor and a switch having a first starting position for connecting said probe with said high voltage lead of said generator through said capacitor.

2. A plasma tube starter assembly according to claim 1, further including an insulator ring for insulating said probe from said shield assembly.

3. A plasma tube starter assembly according to claim 1, wherein said capacitor has a capacitance effective to enable current flow for initiating said plasma while limiting said current flow to avoid damage to said tube.

4. A method for starting an inductively coupled plasma tube having a coil with a high voltage lead energizable by a high voltage radio-frequency generator and a grounded lead and wound about a shield assembly defining an axis of said tube, comprising the steps of:
   - inserting a conductive probe along said axis within said coil and insulated from shield assembly; and
   - connecting said probe through a capacitor to said high voltage lead of said generator for a time effective to initiate ionization.

5. A method according to claim 4, further including the step of electrically disconnecting said probe from said generator and connecting said probe with said shield assembly when said plasma is initiated.

6. A method according to claim 4, further including the step of limiting current from said generator to said probe by a capacitor having a capacitance effective to initiate said plasma at a selected internal pressure of said tube without damage to said tube from the arc which initiates the plasma.

* * * * *